United States Patent [19]

Kato

[11] Patent Number: 4,460,527

[45] Date of Patent: Jul. 17, 1984

[54] CERAMIC ROTOR AND MANUFACTURING PROCESS THEREFOR

[75] Inventor: Kiminari Kato, Konan, Japan

[73] Assignee: NGK Insulators, Ltd., Japan

[21] Appl. No.: 260,749

[22] Filed: May 5, 1981

[30] Foreign Application Priority Data

Nov. 20, 1980 [JP] Japan .................. 55-162706

[51] Int. Cl.$^3$ ............................................. C04B 39/12
[52] U.S. Cl. ........................................ 264/56; 264/60; 264/63; 264/65; 264/86
[58] Field of Search ................. 264/60, 332, 63, 325, 264/328.1, 65, 56, 86

[56] References Cited

U.S. PATENT DOCUMENTS

| | | | |
|---|---|---|---|
| 3,887,411 | 6/1975 | Goodyear | 264/65 |
| 3,887,412 | 6/1975 | Styhr | 264/60 |
| 4,096,120 | 6/1978 | Grunke | 264/65 |
| 4,248,813 | 2/1981 | Hattori | 264/60 |
| 4,294,635 | 10/1981 | Hurley | 264/60 |
| 4,368,166 | 1/1983 | Hinton | 264/60 |

OTHER PUBLICATIONS

Ceramics for High Performance Applications, Conference, Nov. 13-16, 1973.

*Primary Examiner*—John Parrish
*Attorney, Agent, or Firm*—Parkhurst & Oliff

[57] ABSTRACT

The disclosed ceramic rotor comprises integrally formed blade portions made of ceramics sintered at atmospheric pressure and a blade-holding portion to which said blade portions are integrally cemented by ceramic material. The blade-holding portion is made of ceramics sintered at atmospheric pressure and has a larger density than that of the blade portions. The thickness of the blade-holding portion is not smaller than the thickness of the blade portions but smaller than the distance between the front and rear surfaces of the blade portions. In the disclosed process, bodies of the blade portions and the blade-holding portion are separately formed and coupled by applying ceramic material therebetween, and the coupled bodies are sintered at atmospheric pressure to produce the ceramic rotor.

10 Claims, 1 Drawing Figure

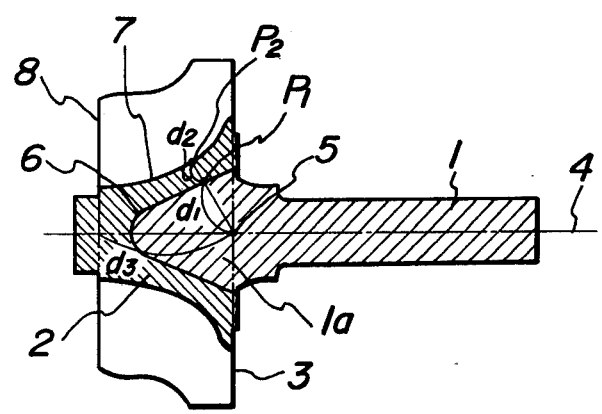

CERAMIC ROTOR AND MANUFACTURING PROCESS THEREFOR

BACKGROUND OF THE INVENTION

1. Field of the Invention

This invention relates to a ceramic rotor of unitary structure and a manufacturing process therefor, which ceramic rotor has a blade-holding portion with excellent mechanical properties at high temperatures and blade portions with excellent heat resistivity, the blade portions being integrally cemented to the blade-holding portion by sintering.

2. Description of the Prior Art

In recent years, to meet the need of energy saving, research efforts have been made to improve the efficiency of turbines and engines by raising the running temperature thereof. In order to run the turbines and engines at a temperature higher than 1,100° C., the engine rotor or turbine rotor is required to have excellent heat resistivity. Furthermore, turbine rotors rotate at high speeds such as 50,000 to 160,000 RPM (revolutions per minute) and experience high tensile stress at high temperatures, so that large forces are applied especially to blade-holding portions of the rotors. Thus, the material of the rotors for high-temperature running is required to have excellent high-temperature strength. Conventionally, nickel- or cobalt-base heat-resisting metals have been used to make heat-resisting turbine rotors, but such conventional heat-resisting metals hardly endure temperatures in excess of 1,100° C. for a long period of time and are very expensive due to limited resources of nickel and cobalt. To replace the expensive heat-resisting metals, ceramic materials with excellent high-temperature properties such as silicon nitride ($Si_3N_4$), sialon, and silicon carbide (SiC) have been studied. For instance, turbine rotors are made of ceramic materials by either one of the following three methods.

(1) A blade-holding portion having grooves on the outer surface thereof is made of silicon nitride ($Si_3N_4$) by hot pressing. Blade portions of complicated three-dimensional shape are formed by injection molding of silicon (Si) powder, and the thus formed blade portions are transformed into silicon nitride ($Si_3N_4$) blade portions of reaction-sintered type by nitriding and sintering. The silicon nitride ($Si_3N_4$) blade portions of reaction-sintered type are fitted in the grooves of the silicon nitride ($Si_3N_4$) blade-holding portion one by one, and the blade portions and the blade-holding portion are integrally cemented by either hot pressing or hot isostatic pressing.

(2) Metallic silicon is poured between those surfaces of the aforesaid grooves of the silicon nitride ($Si_3N_4$) blade-holding portion made by hot pressing and the aforesaid silicon nitride ($Si_3N_4$) blade portions of reaction-sintered type which are to be cemented, so that intermediate layers are formed between the surfaces of the blade portions and the blade-holding portion being cemented. Then, the thus assembled blade portions, blade-holding portion, and the intermediate layers are subjected to nitriding and sintering, so that the metallic silicon of the intermediate layers is transformed into silicon nitride ($Si_3N_4$) and the blade portions are integrally cemented to the blade-holding portion.

(3) Blade portions and a blade-holding portion are integrally formed by injection molding of a ceramic material such as silicon nitride ($Si_3N_4$), silicon carbide (SiC), or metallic silicon (Si). The integral body thus molded is sintered either in an inert gas atmosphere in the case of silicon nitride ($Si_3N_4$) and silicon carbide (SiC), or in a nitrogen gas atmosphere in the case of the metallic silicone (Si).

However, the three methods have shortcomings; namely, the method (1) is not suitable for mass production and very costly because special facilities for the hot pressing are required to produce the blade-holding portion and to cement the blade portions to the blade-holding portion; the method (2) is costly due to the need of hot pressing in producing the blade-holding portion and tends to result in insufficient strength of the cemented surfaces due to the cementing of different materials, i.e., hot pressed silicon nitride and reaction-sintered silicon nitride; and in the method (3), is is difficult to make dense and very strong blade-holding portions and when there is a large difference in thickness between the blade portions and the blade-holding portion, cracks are caused during binder removal treatment so that the yield is low and the method is costly in consequence.

SUMMARY OF THE INVENTION

Therefore, an object of the present invention is to obviate the aforesaid shortcomings of the prior art by providing an improved inexpensive ceramic rotor made of ceramics sintered at atmospheric pressure and a method to manufacture such a ceramic rotor. In a process according to the invention, a mixture is prepared by mixing 100 parts of ceramic powder and 0.1 to 20 parts of sintering agents which are active during sintering at atmospheric pressure. Blade portions are integrally formed from the thus prepared mixture by injection molding or casting, while a blade-holding portion is formed from said mixture by a metal mold and the thus molded body of the blade-holding portion is subjected to isotropic compression in such a manner that, after the ceramic rotor is sintered, the density of the blade-holding portion is larger than that of the blade portions. Preferably, those surfaces of the blade portions and the blade-holding portion which are to be cemented are treated by machining. Ceramic paste is applied to the surfaces to be cemented. Then, the blade portions and the blade-holding portion are cemented and sintered at atmospheric pressure to produce a ceramic rotor of unitary structure. One feature of the ceramic rotor of the invention thus formed is that, at the junction between the blade portions and the blade-holding portion, the wall thickness of the blade-holding portion $d_1$ is not smaller than the wall thickness of the blade portions $d_2$, i.e., $d_1 \geq d_2$, provided that the two thicknesses are measured along one commmon straight line, and the wall thickness of the blade-holding portion $d_1$ is smaller than a dimension $d_3$ of the blade portions which dimension $d_3$ is from a plane defined by front surfaces of the blade portions to a plane defined by rear sufaces of the blade portions, i.e., $d_1 < d_3$.

The ceramic rotor of the invention can be used as a rotor of an engine turbocharger or a rotor of a gas turbine engine. In either case, the tensile stress caused at the blade-holding portion is considerably larger than that at the blade portions, so that the blade-holding portion is required to have a greater high-temperature strength than that required for the blade portion. On the other hand, although the stress at the blade portions is smaller than that at the blade-holding portion, the blade portions are exposed to high-temperature gas passing therethrough so that the blade portions are required to have excellent heat resistances such as resistance against thermal shock and resistance against high-temperature corrosion.

Another object of the present invention is to provide a process for low-cost production of the aforesaid improved ceramic rotor by using materials which are most suitable for the aforesaid properties required of the blade portions and the blade-holding portion thereof.

It is noted that when a ceramic rotor of the invention is used in a radial flow turbine, a blade-holding portion of the ceramic rotor acts as a shaft of the turbine.

BRIEF DESCRIPTION OF THE DRAWING

For a better understanding of the invention, reference is made to the accompanying drawing, in which:

The single FIGURE is a schematic sectional view of a ceramic rotor according to the present invention, which ceramic rotor has a unitary structure with blade portions integrally cemented to a blade-holding portion thereof.

In the FIGURE, 1 is a blade-holding portion, 2 is a blade portion, 3 is a rear surface, 4 is a central axis of the ceramic rotor, 5 is a point of intersection, 6 is a cemented surface, 7 is a curved surface, and 8 is a front surface.

DESCRIPTION OF THE PREFERRED EMBODIMENT

Referring to the single FIGURE of the drawing, a blade-holding portion 1 has a shaft portion 1a to which blade portions 2 are cemented so as to form a ceramic rotor of unitary structure. Rear surfaces 3 of the blade portions 2 define a plane which intersects a central axis 4 of the ceramic rotor at a point of intersection 5. The blade portions 2 are cemented to the blade-holding portion 1 at a cemented surface 6. Inter-blade center lines of the blade portions 2 define a curved surface 7 surrounding the central axis of ceramic rotor 4. Front surfaces 8 of the blade portions 2 define another plane which is separated from the aforesaid plane defined by the rear surfaces 3 thereof.

In the embodiment of the single figure, wall thickness of the blade-holding portion $d_1$ and wall thickness of the blade portions $d_2$ are defined as follows: namely, when a straight line through the point of intersection 5 between the central axis of ceramic rotor 4 and the plane defined by the rear surfaces 3 of the blade portions 2 intersects the cemented surface 6 and the aforesaid curved surface 7 at a first point $P_1$ and a second point $P_2$ respectively, the wall thickness of the blade-holding portion $d_1$ is the distance from the point of intersection 5 to the aforesaid first point $P_1$ where the straight line intersects the cemented surface 6, while the wall thickness of the blade portions $d_2$ is the distance between the first and second points $P_1$ and $P_2$ where the straight line intersects the cemented surface 6 and the curved surface 7 respectively. The distance between the planes defined by the front surfaces 8 and the rear surfaces 3 of the blade portions 2 is designated by $d_3$.

In the ceramic rotor according to the present invention, the wall thickness of the blade-holding portion $d_1$ is not smaller than the wall thickness of blade portions $d_2$, provided that the two wall thicknesses are taken along one common straight line originating at intersection point 5, but the wall thickness of the blade-holding portion $d_1$ is smaller than the distance $d_3$ between the planes defined by the front and rear surfaces of the blade portions, namely, $d_1 < d_3$ and $d_1 \geq d_2$.

The blade-holding portion 1 of the ceramic rotor of the invention is made of, for instance, silicon nitride ($Si_3N_4$) or silicon carbide (SiC) and has a density and a wall thickness which are larger than the corresponding density and wall thickness of the blade portions 2. Besides, the blade-holding portion 1 has a high strength at elevated temperatures. Accordingly, even when the ceramic rotor revolves at a high speed, the blade-holding portion 1 has ample strength to bear the large tensile stress applied thereto.

On the other hand, the blade portions 2 have comparatively thin walls of complicated three-dimensional shape and are made of, for instance, silicon nitride ($Si_3N_4$), sialon, or silicon carbide (SiC). Although the blade portions 2 are exposed to higher temperatures than the blade-holding portion 1, the stress caused in the blade portions 2 is comparatively small, so that blade portions 2 with sufficient mechanical strength can be formed by injection molding or casting followed by sintering at atmospheric pressure. Furthermore, in the ceramic rotor according to the present invention, both the blade portions 2 and the blade-holding portion 1 are sintered at atmospheric pressure and have a density of more than 80% of theoretical density. Cementing paste to be used in the present invention has excellent high-temperature properties and preferably consists of materials similar to those of the blade portions 2 and the blade-holding portion 1, so that reactions at the cementing portions are fully effected and a very high strength is provided at the cemented portions.

In the ceramic rotor of the invention, the wall thickness of the blade-holding portion $d_1$ is not smaller than the wall thickness of the blade portions $d_2$, i.e., $d_1 \geq d_2$, so that the blade-holding portion 1 has ample strength to bear the large tensile stress caused during high-speed rotation of the ceramic rotor. When the blade portions 2 are cemented to the blade-holding portion 1 of the ceramic rotor of the present invention, if the blade-holding portion 1 is pushed lightly from the rear side toward the front side of the blade portions 2, good cementing with a high strength can be achieved. However, if the wall thickness of the blade-holding portion $d_1$ becomes the same or larger than the distance $d_3$ between the planes defined by the front surfaces 8 and the rear surfaces 3 of the blade portion 2, i.e., $d_1 \geq d_3$, it becomes difficult to push the blade-holding portion 1 toward the front side of the blade portions 2, so that the cementing between the blade portions 2 and the blade-holding portion 1 tends to become weak. Besides, if the front end of the blade-holding portion 1 projects out of the front surface of the blade portions 2, the cemented surface becomes susceptible to breakage from minute weak points when sudden thermal shock is applied thereto, and such weak points tend to provide starting points of corrosion caused by high-temperature gas.

A process of manufacturing the ceramic rotor according to the present invention will be now described. At least one homogeneous mixture is prepared by mixing 100 parts of ceramic powder selected from the group consisting of silicon nitride ($Si_3N_4$), sialon, and silicon carbide (SiC), and 0.1 to 20 parts, preferably 1 to 10, of sintering agents to be active during sintering at atmospheric pressure, said sintering agents being selected from the group consisting of magnesium oxide (MgO), beryllium oxide (BeO), cerium oxide ($CeO_2$), strontium oxide (SrO), boron carbide ($B_4C$), and carbon (C), and thoroughly agitating the ingredients. The blade portions of integral form are made either by adding about 0.1 to 30%, preferably 5 to 20%, of plasticizer to the aforesaid mixture, said plasticizer being selected from the group consisting of resins such as polypropylene, polystyrene, polyethylene, ethylene-vinyl acetate copolymer resin, and methyl cellulose, and wax, agitating the mixture after the addition, injection molding the agitated mixture, and binder-removing the molded body; or by preparing a slip by adding about 0.01 to 5% of deflocculant and binder in the mixture, said deflocculant and binder being selected from the group consisting of various amines, sodium alginate, ammonium alginate, sodium polyacrylate, and sodium oxalate, and pouring the slip in a mold. Separately, a blade-holding portion with a larger density and a greater wall thickness than those of the aforesaid blade portions after being sintered is prepared by metal molding of the aforesaid mixture of ceramic powder and sintering agents, and applying isotropic compression to the molded body through a rubber pressing process or the like, and preferably treating the surfaces to be cemented by machining. Heat resisting paste, which is preferably made of materials similar to those of the blade portions and the blade-holding portion, is applied to those surfaces of the blade portions and the blade-holding portion which are to be cemented. The blade portions are cemented to the blade-holding portion, and the thus cemented blade portions and the blade-holding portion are then sintered at atmospheric pressure, and a ceramic rotor of unitary structure is obtained, which ceramic rotor has a density of 80% of theoretical density or more. In the ceramic rotor thus obtained, the blade-holding portion has a higher density and a greater wall thickness than those of the blade portions.

In the process according to the present invention, it is noticed that the strength of the cemented portions between the blade portions and the blade-holding portion of the ceramic rotor can be improved by applying paste to various surfaces to be cemented, coupling the thus pasted surfaces, and applying cold isotropic compression to the portions being cemented through a rubber pressing process. The pressure to be used in the rubber pressing of the portions being cemented is preferably higher than each of the pressure for injection molding of the blade portions and the pressure for isotropic compression of the blade-holding portion. Although the best materials for the aforesaid ceramic paste are those which are the same as the materials of the blade portions and the blade-holding portion, it is also possible to prepare the ceramic paste to be used in the process of the invention from ceramic powder having excellent high-temperature properties and a high reactivity with the materials of the blade portions and the blade-holding portion, such as glass of cordierite composition, the sintering agents for sintering at atmospheric pressure, e.g., magnesium oxide (MgO), beryllium oxide (BeO), cerium oxide (CeO$_2$), strontium oxide (SrO), boron carbide (B$_4$C), and carbon (C), and a mixture of said materials. To further improve the strength of the cemented portions, it is effective to increase the contact areas between the blade portions and the blade-holding portion. Accordingly, it is preferable to calcine the shaped bodies of the blade portions and the blade-holding portion and to treat the surfaces to be cemented by machining, such as smoothing of the surfaces to be cemented by lathe, so as to increase the contact areas.

The invention will be explained in further detail by referring to examples.

EXAMPLE 1

A mixture to be sintered at atmostpheric pressure was prepared by mixing 100 parts of silicon nitride (Si$_3$N$_4$) powder consisting essentially of α phase and having an average grain diameter of 0.3μ and sintering agents consisting of 3 parts of magnesium oxide (MgO), 2 parts of strontium oxide (SrO), and 3 parts of cerium oxide (CeO$_2$), and thoroughly agitating the ingredients. Blade portions of a turbocharger were integrally formed by adding 15% of polypropylene resin to a part of the mixture thus prepared, and injection molding the resin-added mixture. Separately, a shaft or blade-holding portion of the turbocharger was formed by making a press material by adding 2% of polyvinyl alcohol to the remainder of the aforesaid mixture and thoroughly kneading, pressing the press material by a metal mold, applying isotropic compression to the thus prepared body by a rubber press, and machining one end of the body into a circular cone shape. Those surfaces of the thus formed blade portions and blade-holding portion which were to be cemented together were smoothed by machining by a lathe. Paste of silicon nitride (Si$_3$N$_4$) powder for sintering at atmospheric pressure, which paste contained sintering agents consisting of 4.5 parts of magnesium oxide (MgO), 3 parts of strontium oxide (SrO), and 4.5 parts of cerium oxide (CeO$_2$), was applied to the thus smoothed surfaces. After coupling the blade portions to the shaft, the coupled body was airtightly enclosed by a rubber mold so as to apply isotropic compression thereto, and an integral shaped body with the blade portions strongly cemented to the blade-holding portion of the shaft was formed. The integral shaped body was sintered by heating at 1,700° C. for one hour in a nitrogen atmosphere at atmospheric pressure, whereby a ceramic rotor of unitary structure made of silicon nitride (Si$_3$N$_4$) sintered at atmospheric pressure was produced as shown in the accompanying single FIGURE. The blade portions of the thus produced ceramic rotor of the turbocharger had an average wall thickness of 5 mm, a density of 88% of theoretical density, and a four-point flexural strength of 51 kg/mm$^2$, while the shaft thereof had a minimum wall thickness of 10 mm, a density of 95% of theoretical density, and a four-point flexural strength of 63 kg/mm$^2$. The cemented portions of the thus produced ceramic rotor had a strength of 50 kg/mm$^2$.

EXAMPLE 2

A mixture to be sintered at atmospheric pressure was prepared by adding sintering agents into silicon carbide (SiC) powder consisting essentially of β phase and having an average grain diameter of 0.2μ, the sintering agents consisting of 2.5% of boron carbide (B$_4$C) and 2% of carbon (C), and thoroughly agitating the mixture. A slip was made by adding 0.5% of sodium alginate to a part of the aforesaid mixture thus prepared, and blade portions of a turbocharger were integrally formed by pouring the slip into a mold. Separately, a shaft or blade-holding portion of the turbocharger was formed by making a press material by adding 2.5% of polyvinyl alcohol into the remainder of the aforesaid mixture and thoroughly kneading, pressing the press material by a metal mold, and applying isotropic compression to the thus pressed body by a rubber press. Those surfaces of the thus formed blade portions and shaft which were to be cemented were machined by a lathe into mating circular truncated cone shapes, and a paste of silicon carbide (SiC) powder containing sintering agents was applied to the thus machined surfaces. After coupling the blade portions to the shaft, the coupled body was airtightly enclosed by a rubber mold so as to apply isotropic compression thereto. The compression body was sintered at 2,050° C. for 0.5 hour in an argon gas atmosphere at atmospheric pressure, whereby a ceramic rotor of unitary structure made of silicon carbide (SiC) sintered at atmospheric pressure was produced. The blade portions of the thus produced ceramic rotor had an average wall thickness of 3 mm and density of 91% of theoretical density, while the hub portion thereof had a wall thickness of about 15 mm and a density of 94% of theoretical density. The ceramic rotor had four-point flexural strengths of 35 kg/mm² at the blade portions and 43 kg/mm² at the hub portion.

As described in the foregoing, the present invention provides a ceramic rotor made of ceramic material sintered at atmospheric pressure, which ceramic rotor comprises a blade-holding portion having a large density and a large wall thickness and excellent high-temperature mechanical properties, and blade portions of complicated three-dimensional shape having a smaller density and a smaller wall thickness than those of the blade-holding portion, said blade portions being cemented to said blade-holding portion by ceramic material. Accordingly, the ceramic rotor of the present invention is inexpensive as compared with conventional ceramic rotors and yet has excellent high-temperature properties, so that the ceramic rotor of the invention is very useful in industries.

Although the invention has been described with a certain degree of particularity, it is understood that the present disclosure has been made only by way of example and that numerous changes in details of construction and the combination and arrangement of parts may be resorted to without departing from the scope of the invention as hereinafter claimed.

What is claimed is:

1. A process of producing a ceramic rotor, comprising steps of preparing at least one mixture consisting of 100 parts of ceramic powder and 0.1 to 20 parts of sintering agents which are active during sintering at atmospheric pressure, forming a body of blade portions of integral structure from said mixture by one of injection molding and casting, forming a body of a blade-holding portion by casting said mixture in a metal mold and applying isotropic compression to the thus cast body so as to cause said blade-holding portion to have a larger density after sintering than that of said blade portions after sintering, applying ceramic paste to those surfaces of said body of blade portions and said body of blade-holding portion which are to be cemented, coupling said bodies at said pasted surfaces, and sintering the thus coupled bodies in an atmosphere selected from the group consisting of nitrogen and inert gases at atmospheric pressure so as to produce a ceramic rotor of unitary structure with said blade portions integrally cemented to said blade-holding portion along a cemented surface therebetween in such a manner that, said blade portions have front surfaces defining a first plane and rear surfaces defining a second plane, said second plane intersecting a central axis of said rotor at a first point and being spaced from said first plane by a distance $d_3$ along said central axis, and said blade portions have interblade center lines defining a curved surface surrounding said central axis, said cemented surface is located between said curved surface and said central axis so that a distance $d_1$ from an arbitrary point on said cemented surface to said first point along a straight line therebetween is smaller than said distance $d_3$ but not smaller than a distance $d_2$ from said arbitrary point on said cemented surface to said curved surface taken along said straight line, namely, $d_1 < d_3$ and $d_1 \geq d_2$.

2. A process as set forth in claim 1, wherein said ceramic powder to be sintered at atmospheric pressure to form said blade portions is selected from the group consisting of silicon nitride ($Si_3N_4$) and sialon, and said ceramic powder to be sintered at atmospheric pressure to form said blade-holding portion is silicon nitride ($Si_3N_4$).

3. A process as set forth in claim 1, wherein said ceramic powder to form said blade portions and said ceramic powder to form said blade-holding portion are both silicon carbide (SiC) to be sintered at atmospheric pressure.

4. A process as set forth in claim 1, wherein 1 to 10 parts of said sintering agents are added to 100 parts of ceramic powder to prepare said mixture.

5. A process as set forth in claim 1, wherein said sintering agents are at least one compound selected from the group consisting of magnesium (MgO), beryllium oxide (BeO), cerium oxide ($CeO_2$), strontium oxide (SrO), boron carbide ($B_4C$), and carbon (C).

6. A process as set forth in claim 1, wherein 0.1 to 30% of at least one plasticizer selected from the group consisting of polypropylene, polystyrene, polyethylene, ethylene-vinyl acetate copolymer resin, methyl cellulose, and wax is added in said mixture.

7. A process as set forth in claim 1, wherein 0.01 to 5% of at least one of deflocculant and binder selected from the group consisting of amines, sodium alginate, ammonium alginate, sodium polyacrylate, and sodium oxalate is added in said mixture.

8. A process as set forth in claim 1, wherein said isotropic compression is applied by rubber pressing.

9. The process of claim 1, wherein the pasted surfaces comprise conical surfaces having closed rounded tips.

10. The process of claim 1, additionally comprising the preliminary steps of forming the pasted surfaces on each of the blade and blade-holding portions, respectively, said pasted surfaces being formed in the shape of conical surfaces having closed rounded tips.

* * * * *